(12) United States Patent
Takemoto et al.

(10) Patent No.: US 10,662,852 B2
(45) Date of Patent: May 26, 2020

(54) EXHAUST HEAT RECOVERY DEVICE

(71) Applicant: FUTABA INDUSTRIAL CO., LTD., Okazaki-shi, Aichi (JP)

(72) Inventors: Naohiro Takemoto, Okazaki (JP); Hiromi Ishikawa, Okazaki (JP); Yoshiki Tsuji, Okazaki (JP)

(73) Assignee: FUTABA INDUSTRIAL CO., LTD, Okazaki-Shi, Aichi (JP)

( * ) Notice: Subject to any disclaimer, the term of this patent is extended or adjusted under 35 U.S.C. 154(b) by 29 days.

(21) Appl. No.: 15/760,956

(22) PCT Filed: Jan. 22, 2016

(86) PCT No.: PCT/JP2016/051918
§ 371 (c)(1),
(2) Date: Mar. 16, 2018

(87) PCT Pub. No.: WO2017/126122
PCT Pub. Date: Jul. 27, 2017

(65) Prior Publication Data
US 2018/0266296 A1    Sep. 20, 2018

(51) Int. Cl.
*F01N 3/02*    (2006.01)
*F01N 3/10*    (2006.01)
(Continued)

(52) U.S. Cl.
CPC .............. *F01N 5/02* (2013.01); *F01N 3/0205* (2013.01); *F01N 3/10* (2013.01); *F01N 13/009* (2014.06);
(Continued)

(58) Field of Classification Search
CPC ...... F01N 3/0205; F01N 5/02; F01N 2240/02; F01N 2260/24; F01N 15/0266; F01N 21/0003
See application file for complete search history.

(56) References Cited

U.S. PATENT DOCUMENTS

2010/0043413 A1    2/2010    Orihashi et al.

FOREIGN PATENT DOCUMENTS

DE    3603378 A1 *    8/1986    ............. B60H 1/025
JP    2007100665 A    4/2007
(Continued)

OTHER PUBLICATIONS

International Preliminary Report on Patentability for International Patent Application No. PCT/JP2016/051918, dated Aug. 2, 2018, 7 pages.
(Continued)

*Primary Examiner* — Audrey K Bradley
(74) *Attorney, Agent, or Firm* — Withrow & Terranova, P.L.L.C.; Vincent K. Gustafson

(57) ABSTRACT

An exhaust heat recovery device includes a first heat exchanger, a second heat exchanger, a gas passage, a liquid passage, and a self-pressure valve. The first heat exchanger performs heat exchange between exhaust gas and a heat medium so as to evaporate the heat medium. The second heat exchanger performs heat exchange between a heated target and the heat medium evaporated in the first heat exchanger, the heated target being defined as at least one of cooling water and oil so as to heat the heated target and to liquefy the heat medium. A loop heat pipe is formed by the first heat exchanger, the second heat exchanger, the gas passage, and the liquid passage.

6 Claims, 2 Drawing Sheets

(51) Int. Cl.
*F01N 5/02* (2006.01)
*F01N 13/00* (2010.01)

(52) U.S. Cl.
CPC .... *F01N 2240/02* (2013.01); *F01N 2260/024* (2013.01); *Y02T 10/16* (2013.01)

(56) References Cited

FOREIGN PATENT DOCUMENTS

| JP | 2008144595 A | 6/2008 |
| JP | 2008255944 A | 10/2008 |
| JP | 2009257139 A | 11/2009 |
| JP | 2010133349 A | 6/2010 |

OTHER PUBLICATIONS

International Search Report for International Patent Application No. PCT/JP2016/051918 (Form PCT/ISA/210), dated Feb. 16, 2016 (2 pages).
Notification of Reasons for Refusal for Japanese Patent Application No. 2017-562412 dated Nov. 20, 2018 (6 pages including English machine translation).
Notification of Reasons for Refusal for Japanese Patent Application No. 2017-562412 dated Aug. 21, 2018 (6 pages including English machine translation).
Second Office Action for Chinese Patent Application No. 201680054963.7, dated Jan. 17, 2020, 17 pages including English translation.

\* cited by examiner

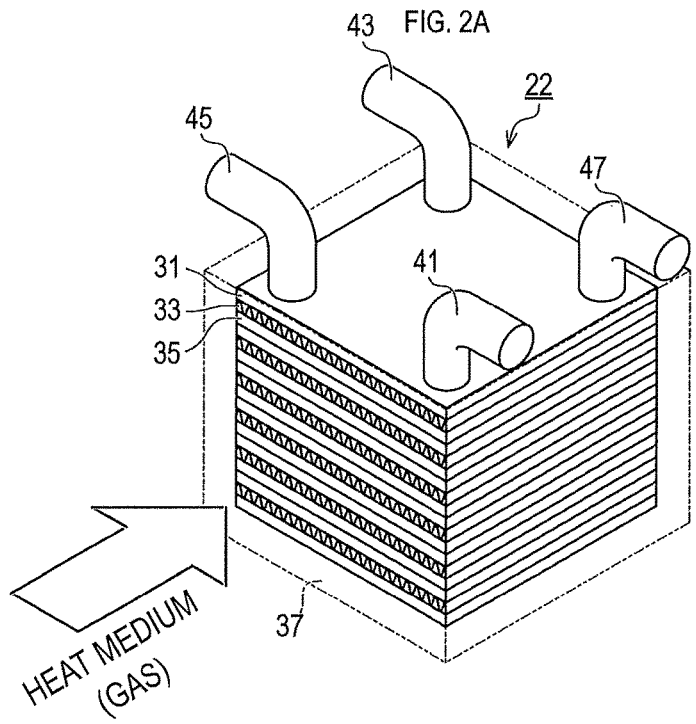
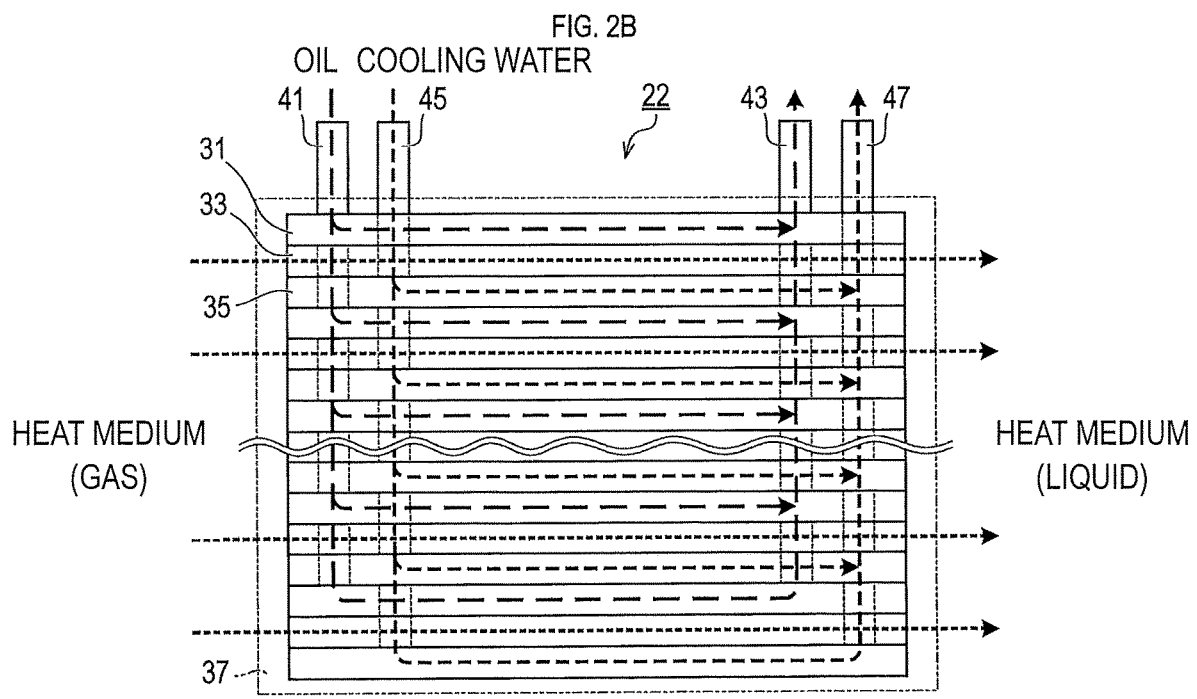

EXHAUST HEAT RECOVERY DEVICE

CROSS-REFERENCE TO RELATED APPLICATION(S)

This application is a 35 U.S.C. § 371 national phase filing of International Application No. PCT/JP2016/051918 filed Jan. 22, 2016, wherein the disclosure of the foregoing application is hereby incorporated by reference herein.

TECHNICAL FIELD

The present disclosure relates to an exhaust heat recovery device.

BACKGROUND ART

A device that recovers heat from exhaust gas to use in warming up an engine is proposed (for example, see Patent Document 1). Further, in Patent Document 1, a configuration that uses a loop heat pipe to recover the heat from the exhaust gas is disclosed.

PRIOR ART DOCUMENT

Patent Document

Patent Document 1: Japanese Unexamined Patent Application Publication No. 2008-255944

SUMMARY OF THE INVENTION

Problems to be Solved by the Invention

In a technique described in Patent Document 1, an evaporation portion of the loop heat pipe is installed in a passage of the exhaust gas. Thus, in a case in which a large amount of the exhaust gas is discharged, for example, when the engine is driven at a high rotation speed and so forth, the evaporation portion interrupts the discharge of the exhaust gas, and thereby unnecessary load is applied to an exhaust system of the engine.

Further, in the technique described in Patent Document 1, since the heat from the exhaust gas is always transmitted to the evaporation portion, for example in a case in which a large amount of the exhaust gas is discharged, the evaporation portion might be excessively heated. In such a case, due to a situation where an evaporation amount of a heat medium becomes excessive and pressure in a system of the loop heat pipe becomes excessive, or the like, a load is applied to the loop heat pipe. Further, in order to avoid failure of the loop heat pipe even in a case in which such a load is applied to the loop heat pipe, it is necessary to take a measure or the like, such as adopting a structure in which each portion of the loop heat pipe has sufficiently high pressure resistance, and such a measure takes a great deal of time.

Further, in the technique described in Patent Document 1, a condensation portion of the loop heat pipe is installed in an engine block or the like. Thus, for example in a case in which the engine block or the like already reaches a sufficiently high temperature, transferring efficiency of the heat from the heat medium to the engine block or the like is deteriorated, and therefore the system of the loop heat pipe might be excessively heated.

From a viewpoint described above, it is preferable to provide an exhaust heat recovery device capable of recovering heat from exhaust gas by using a loop heat pipe and capable of suppressing excessive heating of a system of the loop heat pipe.

Means for Solving the Problems

An exhaust heat recovery device described below comprises a first heat exchanger, a second heat exchanger, a gas passage, a liquid passage, and a self-pressure valve. The first heat exchanger is formed to evaporate a heat medium by performing heat exchange between exhaust gas discharged from an internal combustion engine and the heat medium. The second heat exchanger is formed to heat a heated target and liquefies the heat medium by performing heat exchange between the heated target and the heat medium evaporated in the first heat exchanger, the heated target being defined as at least one of cooling water and oil. The gas passage is formed to allow the heat medium evaporated in the first heat exchanger to flow toward the second heat exchanger. The liquid passage is formed to allow the heat medium liquefied in the second heat exchanger to flow toward the first heat exchanger. The self-pressure valve is formed to be opened and closed such that an opening degree of the self-pressure valve is changed by pressure of the exhaust gas and a flow amount of the exhaust gas that flows into the first heat exchanger is adjusted in accordance with the opening degree. In this configuration, a loop heat pipe is formed by the first heat exchanger, the second heat exchanger, the gas passage, and the liquid passage. The loop heat pipe is a device formed to circulate the fluid by using a capillary phenomenon and at the same time, heat transfer is performed by using a phase change between the liquid and the gas.

According to the exhaust heat recovery device formed in such a way, heat exchange is performed between the exhaust gas and the heat medium by using the loop heat pipe formed by the first heat exchanger, the second heat exchanger, the gas passage, and the liquid passage so that the heat from the exhaust gas can be recovered. Further, heat exchange is performed between the heat medium and the heated target so that the heated target can be heated. Accordingly, the heat medium can be moved between the first heat exchanger and the second heat exchanger without using a pump or electric power, and therefore energy consumption can be suppressed and fuel efficiency can be improved.

Further, in the exhaust heat recovery device described above, the flow amount of the exhaust gas that flows into the first heat exchanger can be adjusted in accordance with the opening degree of the self-pressure valve. Thus, in a case in which a large amount of the exhaust gas is discharged, for example, when the engine is driven at a high rotation speed and so forth, it is possible that only a part of the exhaust gas is allowed to flow into the first heat exchanger and therefore a remaining part of the exhaust gas can be discharged toward an outside of the system without allowing the remaining part of the exhaust gas to flow into the first heat exchanger. Accordingly, contrary to the technique in which all of the exhaust gas is used as a target of the heat exchange with the heat medium, the remaining part of the exhaust gas is not interrupted to flow by the first heat exchanger, and thereby a load applied to the exhaust system of the engine can be decreased.

Further, in the exhaust heat recovery device described above, the flow amount of the exhaust gas that flows into the first heat exchanger is adjusted in accordance with the opening degree of the self-pressure valve, and thereby even in a case in which a large amount of the exhaust gas is discharged, heat is recovered from only a part of the exhaust gas in the first heat exchanger and heat is not recovered from the remaining part of the exhaust gas. Thus, excessive evaporation of the heat medium can be suppressed and excessive pressure in the system of the loop heat pipe can be suppressed, and therefore an excessive load is not applied to the loop heat pipe. Accordingly, it is not necessary to adopt a structure in which each portion of the loop heat pipe has excessively high pressure resistance, and therefore time to form such a pressure resistant structure can be omitted.

Further, in the exhaust heat recovery device described above, the opening degree of the self-pressure valve is changed by the pressure of the exhaust gas. Thus, contrary to, for example, an electric valve, it is not necessary to adopt an actuator such as a solenoid and a motor, and it is also not necessary to arrange a control device that controls such an actuator as a controlled target, and it is also not necessary to execute control by using such a control device. Accordingly, the structure and the control can be simplified compared to a case in which the electric valve is adopted. Further, the valve can be opened and closed without using electric power or the like, the energy consumption can be suppressed also in this point and the fuel efficiency can be improved.

Further, in the exhaust heat recovery device described above, the heat exchange is performed between the heat medium and the heated target in the second heat exchanger, and the heated target is defined as at least one of the cooling water and the oil. Thus, contrary to a technique in which the heated target is defined as the engine block or the like, in case that the heated target is the cooling water, the heat can be dissipated by the radiator. Further, in case that the heated target is the oil, the heat can be dissipated by the oil cooler. Accordingly, even in a case in which the heated target is defined as either of the cooling water and the oil, excessive heat of the loop heat pipe can be easily suppressed compared to the case in which the heated target is defined as the engine block or the like. That is, in a case in which the cooling water and the oil are low in temperature, the cooling water and the oil can be heated by the loop heat pipe, and after the cooling water and the oil are sufficiently increased in temperature, dissipation of the heat from the system of the loop heat pipe can be enhanced by cooling the cooling water and the oil in the radiator and the oil cooler.

BRIEF DESCRIPTION OF THE DRAWINGS

FIG. 2A is a perspective view illustrating a schematic configuration of a three-fluid heat exchanger that forms a second heat exchanger. FIG. 2B is a vertical cross-sectional view illustrating a schematic configuration of the three-fluid heat exchanger that forms the second heat exchanger.

EXPLANATION OF REFERENCE NUMERALS

Figure 1:
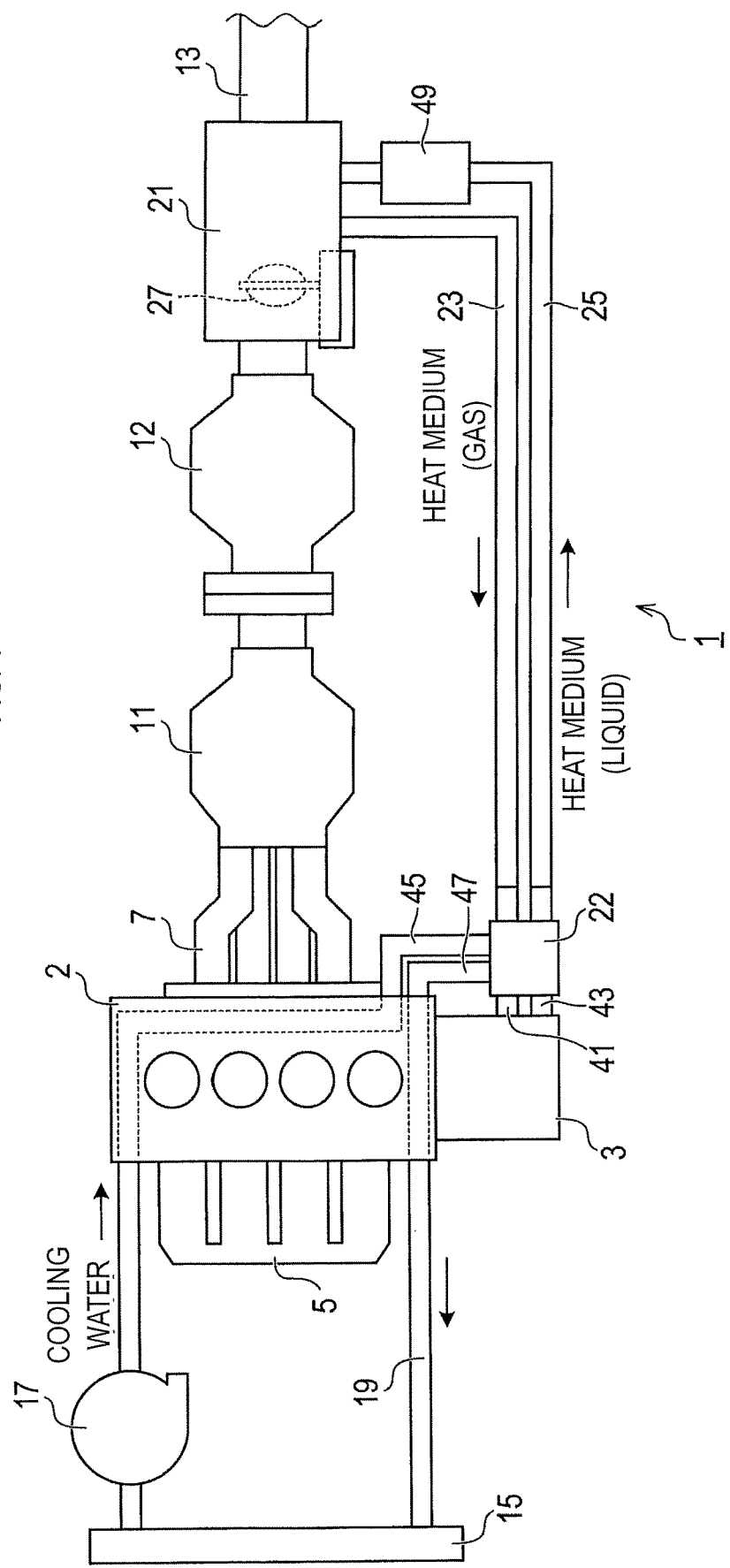
FIG. 1 is a diagram illustrating a schematic configuration of on-vehicle devices comprising an exhaust heat recovery device.

1 . . . exhaust heat recovery device, 2 . . . internal combustion engine, 3 . . . transmission, 5 . . . intake manifold, 7 . . . exhaust manifold, 11 . . . first catalyst, 12 . . . second catalyst, 13 . . . exhaust pipe, 15 . . . radiator, 17 . . . water pump, 19 . . . cooling water pipe, 21 . . . first heat exchanger, 22 . . . second heat exchanger, 23 . . . gas passage, 25 . . . liquid passage, 27 . . . self-pressure valve, 31 . . . oil plate, 33 . . . heat medium plate, 35 . . . cooling water plate, 37 . . . shell, 41 . . . oil supply passage, 43 . . . oil discharge passage, 45 . . . cooling water supply passage, 47 . . . cooling water discharge passage, 49 . . . vapor heat dissipation trap device

MODE FOR CARRYING OUT THE INVENTION

Next, the exhaust heat recovery device described above is described with reference to an exemplary embodiment.

[Configuration of Exhaust Heat Recovery Device]

An exhaust heat recovery device 1 shown in FIG. 1 is mounted to a moving body (for example, a vehicle or the like) having an internal combustion engine 2 so as to recover heat from exhaust gas discharged from the internal combustion engine 2. In addition to the internal combustion engine 2, a transmission 3 or the like is mounted to the moving body. Further, an intake manifold 5 and the like are provided as an intake system of the internal combustion engine 2 (namely, a device, a component or the like that forms an intake passage). An exhaust manifold 7, a first catalyst 11, a second catalyst 12, an exhaust pipe 13, and the like are provided as an exhaust system of the internal combustion engine 2 (namely, a device, a component or the like that forms an exhaust passage). Further, a radiator 15, a water pump 17, a cooling water pipe 19 and the like are provided as a cooling system of the internal combustion engine 2 (namely, a device, a component or the like that forms a cooling water passage).

The exhaust heat recovery device 1 comprises a first heat exchanger 21, a second heat exchanger 22, a gas passage 23, a liquid passage 25, a self-pressure valve 27 and the like. Of these components, a loop heat pipe is formed by the first heat exchanger 21, the second heat exchanger 22, the gas passage 23, and the liquid passage 25. More specifically, the first heat exchanger 21 serves as an evaporator in the loop heat pipe. The second heat exchanger 22 serves as a condenser in the loop heat pipe. The first heat exchanger 21 and the second heat exchanger 22 are in communication with each other through the gas passage 23 and the liquid passage 25, and thereby a circulation passage is formed having a closed loop structure that reaches the second heat exchanger 22 from the first heat exchanger 21 through the gas passage 23 and then returns to the first heat exchanger 21 from the second heat exchanger 22 through the liquid passage 25.

The first heat exchanger 21 is formed by a wick mounted evaporator. The wick mounted evaporator is formed such that a porous body called a "wick" is arranged therein. A liquid heat medium supplied from the liquid passage 25 is absorbed by the wick due to a capillary phenomenon. The heat medium absorbed by the wick is evaporated by heat from the exhaust gas, and the evaporated heat medium flows into the gas passage 23. The heat medium may be formed of a material evaporated (namely, vaporized) when heated by the heat from the exhaust gas, and therefore for example, water, an alcohol aqueous solution, an ammonia aqueous solution or the like may be adopted. The gas passage 23 is formed to allow the heat medium evaporated in the first heat exchanger 21 to flow toward the second heat exchanger 22.

The second heat exchanger 22 is formed to perform heat exchange between a heated target and the heat medium evaporated in the first heat exchanger 21. In the present embodiment, the heated target is defined as both of cooling water (antifreeze liquid in the present embodiment) and oil (transmission oil in the present embodiment). With this, the second heat exchanger 22 heats the heated target and liquefies the heat medium.

The second heat exchanger 22 is formed by a three-fluid heat exchanger as shown in FIG. 2A and FIG. 2B. More specifically, in the second heat exchanger 22, an oil plate 31, a heat medium plate 33, and a cooling water plate 35 are laminated in this order to form a unit structure, and a plurality of the unit structures is laminated to form a lamination body. The lamination body is housed in a shell 37 as an exterior of the second heat exchanger 22.

A plurality of oil plates 31 are in communication with each other through an oil supply passage 41 and an oil discharge passage 43. Oil supplied to the second heat exchanger 22 through the oil supply passage 41 is passed through an inside of the plurality of oil plates 31 toward the oil discharge passage 43 and then the oil is discharged from the second heat exchanger 22 through the oil discharge passage 43. As shown in FIG. 1, each of the oil supply passage 41 and the oil discharge passage 43 is connected to the transmission 3. With this, a circulation passage having a closed loop structure that reaches the second heat exchanger 22 from the transmission 3 through the oil supply passage 41 and then returns to the transmission 3 from the second heat exchanger 22 through the oil discharge passage 43 is formed.

A plurality of cooling water plates 35 are in communication with each other through a cooling water supply passage 45 and a cooling water discharge passage 47. Cooling water supplied to the second heat exchanger 22 through the cooling water supply passage 45 is passed through an inside of the plurality of cooling water plates 35 toward the cooling water discharge passage 47 and then the cooling water is discharged from the second heat exchanger 22 through the cooling water discharge passage 47. As shown in FIG. 1, the cooling water supply passage 45 forms a passage from the radiator 15 toward the second heat exchanger 22 through the water pump 17 and the internal combustion engine 2. Further, the cooling water discharge passage 47 forms a passage from the second heat exchanger 22 toward the radiator 15 through the internal combustion engine 2. A circulation passage having a closed loop structure is formed by the cooling water supply passage 45 and the cooling water discharge passage 47.

The heat medium plate 33 is formed such that the evaporated heat medium flows in from one end of the heat medium plate 33. When the heat medium flows in the heat medium plate 33, the heat medium plate 33 is heated by heat from the heat medium, and further the oil plate 31 and the cooling water plate 35 are heated by heat from the heat medium plate 33. As a result, the oil that flows inside the oil plate 31 is heated, and the cooling water that flows inside the cooling water plate 35 is heated. On the other hand, the heat is discharged from the heat medium in the heat medium plate 33, and thereby the heat medium is condensed and liquefied. The liquefied heat medium flows out from another end of the heat medium plate 33 and then flows into the liquid passage 25.

The liquid passage 25 is formed to supply the heat medium liquefied in the second heat exchanger 22 to the first heat exchanger 21. A vapor heat dissipation trap device 49 is arranged in the liquid passage 25 to suppress backward flow of the evaporated heat medium from the first heat exchanger 21 to the liquid passage 25.

A self-pressure valve 27 is formed to open and close a passage in the exhaust pipe 13, and an opening degree of the self-pressure valve 27 can be changed by pressure of the exhaust gas. A flow amount of the exhaust gas that flows into the first heat exchanger 21 is adjusted in accordance with the opening degree of the self-pressure valve 27. In the present embodiment, when the self-pressure valve 27 is closed, almost all of the exhaust gas flows into the first heat exchanger 21, and when the self-pressure valve 27 is opened, a ratio of the exhaust gas not flowing into the first heat exchanger 21 is increased as the opening degree becomes larger.

[Effects]

According to the exhaust heat recovery device 1 formed as described above, heat exchange is performed between the exhaust gas and the heat medium by using the loop heat pipe formed by the first heat exchanger 21, the second heat exchanger 22, the gas passage 23, and the liquid passage 25 so that the heat from the exhaust gas can be recovered. Further, heat exchange is performed between the heat medium and the heated target (namely, the cooling water and the oil in the present embodiment) by using the loop heat pipe so that the heated target can be heated. Accordingly, the temperature of the cooling water is increased to perform the warming up of the internal combustion engine 2, and the heat can be also used for space heating. Further, the temperature of the oil is increased to decrease friction of the transmission 3. Further, by using the loop heat pipe, the heat medium can be moved between the first heat exchanger 21 and the second heat exchanger 22 without using a pump or electric power, and therefore energy consumption can be suppressed and fuel efficiency can be improved.

Further, in the exhaust heat recovery device 1 described above, the flow amount of the exhaust gas that flows into the first heat exchanger 21 can be adjusted in accordance with the opening degree of the self-pressure valve 27. Thus, in a case in which a large amount of the exhaust gas is discharged, for example, when the engine is driven at a high rotation speed and so forth, it is possible that only a part of the exhaust gas is allowed to flow into the first heat exchanger 21 and therefore a remaining part of the exhaust gas can be discharged toward an outside of the system without allowing the remaining part of the exhaust gas to flow into the first heat exchanger 21. Accordingly, contrary to the technique in which all of the exhaust gas is used as a target of the heat exchange with the heat medium, the remaining part of the exhaust gas is not interrupted to flow by the first heat exchanger 21, and thereby a load applied to the exhaust system of the engine can be decreased.

Further, in the exhaust heat recovery device 1 described above, the flow amount of the exhaust gas that flows into the first heat exchanger 21 is adjusted in accordance with the opening degree of the self-pressure valve 27, and thereby even in a case in which a large amount of the exhaust gas is discharged, heat is recovered from only a part of the exhaust gas in the first heat exchanger 21 and heat is not recovered from the remaining part of the exhaust gas. Thus, excessive evaporation of the heat medium can be suppressed and excessive pressure in the loop heat pipe system can be suppressed, and therefore an excessive load is not applied to the loop heat pipe. Accordingly, it is not necessary to adopt a structure in which each portion of the loop heat pipe has excessively high pressure resistance, and therefore time to form such a pressure resistant structure can be omitted.

Further, in the exhaust heat recovery device 1 described above, the opening degree of the self-pressure valve 27 is changed by the pressure of the exhaust gas. Thus, contrary to, for example, an electric valve, it is not necessary to adopt an actuator such as a solenoid and a motor, and it is also not necessary to arrange a control device that controls such an actuator as a controlled target, and it is also not necessary to execute control by using such a control device. Accordingly, the structure and the control can be simplified compared to a case in which the electric valve is adopted. Further, the valve can be opened and closed without using electric power or the like, the energy consumption can be suppressed also in this point and the fuel efficiency can be improved.

Further, in the exhaust heat recovery device 1 described above, the heat exchange is performed between the heat medium and the heated target in the second heat exchanger, and the heated target is defined as the cooling water and the oil. Thus, contrary to a technique in which the heated target is defined as the engine block or the like, in case that the heated target is the cooling water, the heat can be dissipated by the radiator 15. Further, in case that the heated target is the oil, the heat can be dissipated by the oil cooler. Accordingly, excessive heat in the loop heat pipe system can be easily suppressed compared to the case in which the heated target is defined as the engine block or the like.

[Other Embodiments]

As described above, the exhaust heat recovery device is described with reference to an exemplary embodiment, however the embodiment described above is merely exemplarily described as one aspect of the present disclosure. That is, the present disclosure is not limited to the exemplary embodiment described above, and therefore the present disclosure can be carried out by various embodiments within a scope of the subject matter of the present disclosure.

For example, in the embodiment described above, an example in which the transmission oil is heated by the heat recovered from the exhaust gas in the exhaust heat recovery device 1 is described, however other oil may be heated. Specifically, the heated target is defined as the engine oil.

Further, in the embodiment described above, the second heat exchanger 22 is formed by the three-fluid heat exchanger, however the three-fluid heat exchanger may not be adopted. For example, the second heat exchanger 22 may be formed by a two-fluid heat exchanger. In this case, the heated target may be formed by either of the cooling water and the oil.

Further, in the embodiment described above, an example in which the oil plate 31, the heat medium plate 33, and the cooling water plate 35 are laminated in a specific order is described, however the order of lamination, the number of each of the plates, and the ratio of the numbers of respective plates may be changed in any manner.

Further, in the embodiment described above, the material, the shape, the structure and the like of the components installed in the exhaust heat recovery device of the present disclosure are exemplarily described, however the material, the shape, the structure and the like of the components are not limited to those in the embodiment described above. For example, a portion formed by one component in the embodiment described above may be formed by a plurality of components. Or alternatively, a portion formed by a plurality of the components in the embodiment described above may be formed by one component. Further, a part of the configuration exemplarily described in the embodiment described above may be omitted without completely spoiling the function of the configuration. Further, at least a part of the component of certain embodiment may be added to or replaced with a configuration of other embodiment. Further, at least a part of the configuration of the embodiment described above may be replaced with a known configuration having a similar function.

Further, the present disclosure may be carried out by various embodiments such as an exhaust heat recovery system having the exhaust heat recovery device 1 described above as a component thereof, a warming up system of an internal combustion engine, a warming up system of a transmission, an oil heating system, an exhaust heat recovery method using the exhaust heat recovery device 1 described above, a warming up method of an internal combustion engine, a warming up method of a transmission, and an oil heating method, in addition to the exhaust heat recovery device 1 described above.

[Supplements]

Further, it is clear from the exemplary embodiment described above that the exhaust heat recovery device of the present disclosure may further comprise a configuration described below.

At first, in the exhaust heat recovery device of the present disclosure, the second heat exchanger may be formed by a three-fluid heat exchanger that performs heat exchange between the heat medium, the cooling water, and the oil.

According to the exhaust heat recovery device formed in such a way, both of the cooling water and the oil can be heated. Further, even if either of the radiator for the cooling water and the oil cooler for the oil is not arranged, by arranging either of them, heat from another system can be dissipated. For example, in a case in which the radiator for the cooling water is arranged, the heat from the cooling water can be dissipated, and thereby heat transfer from the heat medium and the oil to the cooling water is promoted, and the heat from the heat medium and the oil can be dissipated.

Further, in the exhaust heat recovery device of the present disclosure, the oil may be formed as a transmission oil.

According to the exhaust heat recovery device formed in such a way, the transmission oil can be increased in temperature so as to decrease friction of the transmission. With this, for example, a shift shock of the transmission can be decreased, and therefore the performance of the transmission can be optimally exerted.

[Disclosure of Related Art]

In the exhaust heat recovery device of the present disclosure, the self-pressure valve is adopted in order to simplify the configuration and the control, however an exhaust heat recovery device having a similar exhaust heat recovery function can be formed by adopting an electric valve when focusing only on performing the opening and closing of the valve. That is, "an electric valve formed to be opened and closed and formed to change an opening degree by electric power to adjust a flow amount of the exhaust gas that flows into the first heat exchanger in accordance with the opening degree" can be adopted instead of the self-pressure valve.

Also even in a case in which such a configuration is adopted, heat can be recovered from the exhaust gas and the heated target can be heated. Further, since the flow amount of the exhaust gas that flows into the first heat exchanger can be adjusted in accordance with the opening degree of the electric valve, a load applied to the exhaust system of the engine can be decreased. Further, the evaporation amount of the heat medium can be suppressed to be excessive and therefore the excessive load is not applied to the loop heat pipe, and thereby it is not necessary to adopt a structure in which each portion of the loop heat pipe has excessively high pressure resistance. Further, contrary to a technique in which the heated target is defined as the engine block or the like, in case that the heated target is the cooling water, the heat can be dissipated by the radiator. Further, in case that the heated target is the oil, the heat can be dissipated by the oil cooler. Accordingly, excessive heat in the loop heat pipe system can be easily suppressed compared to the case in which the heated target is defined as the engine block or the like.

Further, also in a case in which the electric valve is adopted instead of the self-pressure valve, it is preferable that the second heat exchanger is formed by the three-fluid heat exchanger in which heat exchange can be performed between the heat medium, the cooling water, and the oil. By adopting such a configuration, both of the cooling water and the oil can be heated. Further, even if either of the radiator for the cooling water and the oil cooler for the oil is not arranged, by arranging either of them, heat from another system can be dissipated. For example, in a case in which the radiator for the cooling water is arranged, the heat from the cooling water can be dissipated, and thereby heat transfer from the heat medium and the oil to the cooling water is promoted, and the heat from the heat medium and the oil can be dissipated.

The invention claimed is:

1. An exhaust heat recovery device comprising:
    a first heat exchanger that evaporates a heat medium by performing heat exchange between the heat medium and exhaust gas discharged from an internal combustion engine;
    a second heat exchanger that heats a heated target and liquefies the heat medium by performing heat exchange between the heated target and the heat medium evaporated in the first heat exchanger, the heated target including cooling water and oil;
    a gas passage that allows the heat medium evaporated in the first heat exchanger to flow toward the second heat exchanger;
    a liquid passage that allows the heat medium liquefied in the second heat exchanger to flow toward the first heat exchanger; and
    a self-pressure valve formed to be opened and closed, wherein an opening degree of the self-pressure valve is changed by pressure of the exhaust gas and a flow amount of the exhaust gas that flows into the first heat exchanger is adjusted in accordance with the opening degree,
    wherein a loop heat pipe is formed by the first heat exchanger, the second heat exchanger, the gas passage, and the liquid passage,
    wherein the first heat exchanger is coupled to an exhaust pipe that is coupled to an engine block of the internal combustion engine, and
    wherein the second heat exchanger is coupled to a cooling water flow passage that protrudes from the internal combustion engine and to an oil flow passage that protrudes from a transmission.

2. The exhaust heat recovery device according to claim 1, wherein the oil includes a transmission oil.

3. The exhaust heat recovery device according to claim 1, wherein the second heat exchanger is formed by a three-fluid heat exchanger that performs heat exchange between the heat medium, cooling water, and oil.

4. The exhaust heat recovery device according to claim 3, wherein the oil includes a transmission oil.

5. The exhaust heat recovery device according to claim 1, wherein the loop heat pipe is formed by the first heat exchanger, the second heat exchanger, the gas passage, and the liquid passage in the outside of the engine block.

6. The exhaust heat recovery device according to claim 1, wherein the cooling water flow passage includes:
    a cooling water discharge passage to discharge the cooling water from the second heat exchanger to the engine block; and
    a cooling water supply passage to supply the cooling water from the engine block to the second heat exchanger, and
wherein the oil flow passage includes:
    an oil discharge passage to discharge the oil from the second heat exchanger to the transmission; and
    an oil supply passage to supply the oil from the transmission to the second heat exchanger.

* * * * *